United States Patent
Favre et al.

(10) Patent No.: US 9,623,368 B2
(45) Date of Patent: Apr. 18, 2017

(54) DISCONTINUOUS REGIME MEMBRANE SEPARATION PROCESS

(71) Applicants: Centre National de la Recherche Scientifique, Paris (FR); Universite de Lorraine, Vandoeuvre-les-Nancy (FR)

(72) Inventors: Eric Favre, Nancy (FR); Jean-Pierre Corriou, Nancy (FR); Christophe Castel, Vandoeuvre-les-Nancy (FR); Lei Wang, Nancy (FR)

(73) Assignees: Centre National de la Recherche Scientifique, Paris (FR); Universite de Lorraine, Vandoeuvre-les-Nancy (FR)

( * ) Notice: Subject to any disclaimer, the term of this patent is extended or adjusted under 35 U.S.C. 154(b) by 303 days.

(21) Appl. No.: 14/359,499

(22) PCT Filed: Nov. 20, 2012

(86) PCT No.: PCT/IB2012/056572
§ 371 (c)(1),
(2) Date: May 20, 2014

(87) PCT Pub. No.: WO2013/076652
PCT Pub. Date: May 30, 2013

(65) Prior Publication Data
US 2014/0318368 A1    Oct. 30, 2014

(30) Foreign Application Priority Data
Nov. 21, 2011    (FR) ..................... 11 60587

(51) Int. Cl.
*B01D 53/22*    (2006.01)
*B01D 61/00*    (2006.01)

(52) U.S. Cl.
CPC ............. *B01D 53/22* (2013.01); *B01D 61/00* (2013.01); *B01D 2311/22* (2013.01);
(Continued)

(58) Field of Classification Search
CPC .... B01D 53/22; B01D 61/00; B01D 2311/22; B01D 2311/25; B01D 2315/14; B01D 2315/18
See application file for complete search history.

(56) References Cited

U.S. PATENT DOCUMENTS 3,818,679 A      6/1974  Klass et al.
5,120,900 A  *   6/1992  Chen ..................... C07C 7/005
                                                        208/308
(Continued)

OTHER PUBLICATIONS

Fosse "Estimating Lag Time and Permeability in Membranes" Aug. 13, 2010, 14 pages <https://web.archive.org/web/20100813050620/http://www.math.hmc.edu/~levy/181_web/Fosse_web.pdf><https://www.math.hmc.edu/~levy/181_web/Fosse_web.pdf>.*

(Continued)

*Primary Examiner* — Anthony Shumate
(74) *Attorney, Agent, or Firm* — Morgan, Lewis & Bockius LLP

(57) ABSTRACT

A process for separating a gaseous or liquid mixture by means of a separating device including a first volume and a second volume which are separated by a membrane which has selective permeability with respect to at least two components of the mixture, comprising the following steps:
  a) fill up the first volume of the device with the mixture to be separated;
  b) wait for a period of time which is in excess of the permeation lag time, but is insufficient to reach a state of equilibrium, during which time a fraction of each component of the mixture passes from the first to the second volume of the device through the membrane; and (Continued)

c) evacuate the first and the second volume of the device, as a result of which at least one first and one second cut of the mixture is obtained, having different molar compositions.

15 Claims, 11 Drawing Sheets

(52) U.S. Cl.
CPC ...... *B01D 2311/25* (2013.01); *B01D 2315/14* (2013.01); *B01D 2315/18* (2013.01)

(56) References Cited

U.S. PATENT DOCUMENTS

| | | | |
|---|---|---|---|
| 5,354,474 A | 10/1994 | LaPack et al. | |
| 2009/0026130 A1* | 1/2009 | Chikura | B01D 63/10 210/500.23 |
| 2010/0105959 A1* | 4/2010 | Beckers | C07D 301/32 568/621 |
| 2011/0091864 A1* | 4/2011 | Karlsson | B03C 5/005 435/4 |
| 2012/0088227 A1* | 4/2012 | Gruebl | B01L 3/5023 435/5 |
| 2012/0270116 A1* | 10/2012 | Cho | H01M 12/06 429/405 |
| 2015/0314245 A1* | 11/2015 | Nakao | B01D 69/02 210/500.23 |

OTHER PUBLICATIONS

Wang et al., "A critical review of cyclic transient membrane gas separation processes: State of the art, opportunities and limitations," Journal of Membrane Science, 383: 170-188 (2011).

Feng et al., "Pressure swing permeation: Novel process for gas separation by membranes," Aiche Journal, 46: 724-733 (2000).

Paul et al., "Membrane Separation of Gases Using Steady Cyclic Operation," Industrial & Engineering Chemistry Process Design and Development, 10: 375-379 (1971).

International Search Report issued in corresponding International Patent Application No. PCT/IB2012/056572 dated Apr. 4, 2013, 6 pages.

* cited by examiner

DISCONTINUOUS REGIME MEMBRANE SEPARATION PROCESS

The invention is concerned with a process for separating a gaseous or liquid mixture by means of a membrane which has selective permeability. The process of the invention is of the discontinuous type.

Membrane processes are widely used in the industry in order to separate mixtures, in particular gaseous mixtures. Said processes use, as separating elements, membranes which have selective permeability and are generally found in the form of hollow fiber bundles. In a general manner, a "membrane" refers to any wall which has non-zero permeability; typically, the thicknesses of the membranes used in separating processes are as thin as possible, for example less than or equal to 10 μm, even to 1 μm.

FIG. 1 shows a schematic representation of a membrane separation cartridge or module MM known in the prior art. Said module includes an impervious cylindrical casing E (removed in part in the figure), inside which is arranged a permeable membrane MS in the form of a bundle F of hollow fibers FC which are oriented along the axis of the cylinder. The walls of the hollow fibers, as well as two gaskets JE which are situated at the two ends of the bundle, separate the inside of the casing E into two distinct volumes V1 and V2. In the example in figure, V1 corresponds essentially to the inside of the fibers, and V2 to the outside thereof. An inlet duct CA and a first outlet duct CE1 are arranged at the axial ends of the casing E, connected fluidically to the first volume V1 ("upstream volume"); a second outlet duct CE2 traverses the side wall of the casing in order to reconnect fluidically to the second volume V2 ("downstream volume"). The mixture to be separated is injected into the first volume through the inlet duct; part of said mixture traverses the membrane and leaves through the second outlet duct ("permeate"); another part does not traverse the membrane and leaves through the first outlet duct ("retentate>>"). As the permeability of the membrane is selective, the permeate and the retentate constitute "cuts" of the mixture, generally having different compositions.

More often than not, the separation membranes are polymeric and dense, that is to say that they do not have any pores. The transfer of mass through the membrane is effected essentially as a result of a solution-diffusion mechanism: the molecules of the mixture contact a face of the membrane, penetrate into said latter as a result of solubilization, traverse it as a result of molecular diffusion and are released by the opposite face. In the case of a binary mixture, stationary regime selectivity is given by $$\alpha = \frac{D_1 S_1}{D_2 S_2}$$

where $D_1$ (respectively: $D_2$) is the coefficient of diffusion, or diffusivity, of the first (respectively: second) component of the mixture and $S_1$ (respectively: $S_2$) is the solubility of said first (respectively: second) component. Permeation mechanisms of liquid mixtures are generally more complicated, although sometimes the "solution-diffusion" model that will be described can also be applied.

The stationary or continuous regime is, by far, the most used in practice as it avoids the difficulties of implementation and the dead times which characterize discontinuous processes. However, continuous membrane separation processes suffer from their poor selectivity. In fact, diffusivity $D_{1/2}$ is a kinetic term and solubility $S_{1/2}$ is a thermodynamic term. As a result, said two terms often have opposite behaviors, which results in reduced selectivity. For example, let us take the case of a binary mixture constituted by a first component formed by "large" molecules and a second component formed by "small" molecules: frequently, the small molecules will have increased diffusivity, but poor solubility and the opposite will be true for the large molecules. All in all, the selectivity α will be close to 1 (α=1 corresponding to the case where the composition of the permeate and of the retentate is the same, identical to that of the initial mixture).

D. R. Paul was the first to envisage using a pulsed process, therefore not stationary, to improve the selectivity of the membrane separation of a gaseous mixture; see D. R. Paul, "Membrane Separation of Gases Using Steady Cyclic Operation", Ind. Eng. Chem. Process. Des. Develop. Vol. 10, No. 3, 1971. The idea underlying said process is the following: when a gaseous mixture is made to contact a separating membrane, the first molecules which succeed in crossing the membrane are those that diffuse the quickest, independently of their solubility. As a result, during a short period, the selectivity depends essentially on $D_1/D_2$ and is independent of $S_1/S_2$; it is, therefore, generally speaking, greater than the stationary regime selectivity α.

The process by D. R. Paul is cyclical, with a period of time T.

During a first phase that lasts AT (0<A<1), the first volume of the separator is connected to a tank containing the mixture to be separated at the pressure $P_H$, whilst the first outlet duct is closed; as the capacity of the tank is a great deal more than that of the volume V1, the pressure upstream of the membrane ("upstream pressure") amounts to $P_H$. Simultaneously, a first permeate that is highly enriched in the component with the greater diffusivity of the mixture (the component in question) is extracted through the outlet duct. Said first permeate constitutes the product of the process.

Then, during the second phase that lasts (1-A)T, the intake duct is closed and the first outlet duct is open, which causes a pressure drop inside the volume V1 to a value $P_L \ll P_H$. Simultaneously, through the second outlet duct, a second permeate is extracted which is kept separate from said first permeate and can, where applicable, be recycled. In fact, if the first and the second permeate were to be mixed, overall selectivity that is identical to that of the conventional stationary process would be obtained and the increase in selectivity resulting from the pulsed operation would be lost. Said second phase serves to regenerate the membrane.

The main disadvantage of the process by D. R. Paul is that the increase in selectivity is obtained at the detriment of the productivity and of the rate of recovery. The productivity is defined as the number of moles of the component in question which are recovered per unit time and surface of the membrane; the rate of recovery is defined as the ratio between the number of moles in the component in question in the initial mixture and the number of moles in said same component in the (first) permeate. In other words, the process of D. R. Paul supplies a permeate rich in the component in question, but in a poor quantity; the largest part of the moles in said component in question remains in the retentate.

Another limitation of said process is that it can only be used if the component in question is the most permeable; in fact, the composition of the retentate is appreciably equal to that of the initial mixture, without any significant enrichment in the least permeable component.

A small number of other non-stationary regime membrane separation processes have been proposed subsequently.

The article by X. Feng et al. <<Pressure Swing Permeation: Novel Process for Gas Separation by Membranes>>, AIChE Journal, Vol. 46, No. 4, 724,733, describes a discontinuous membrane separation process which has the advantage of supplying a permeate at high pressure, which makes it possible to avoid or reduce the cost of its compression after separation. However, the selectivity is not improved in relation to a conventional process, in continuous regime and with a permeate recovered at low pressure.

Document U.S. Pat. No. 4,955,998 (Ueda) describes a cyclical membrane separation process for a gaseous mixture comprising a step for the pressurized injection of said gaseous mixture from the upstream side of a membrane and a step for the suction of a permeate from the downstream side of said membrane. Said process is supposed to enable energy saving and, at least in certain cases, an increase in the productivity and the selectivity. Said latter effect is not explained. Control of the Ueda process is complicated, and the start-up includes a long-term transient period, during which the composition of the permeate and the retentate is not constant.

The article by Lei Wang, Jean-Pierre Corriou, Christophe Castel and Eric Favre "A critical review of cyclic transient membrane gas separation processes: State of the art, opportunities and limitations>>, Journal of Membrane Science, Volume 383, Issues 1-2, 1 Nov. 2011, Pages 170-188, has a comparative study on different discontinuous regime membrane gas separation processes known from the prior art.

The invention aims to overcome, in total or in part, the aforementioned disadvantages of the prior art. More particularly, it aims to provide a discontinuous regime membrane separation process which has greater selectivity than a conventional continuous process, as well as a relatively high extraction rate and productivity that is sufficient for the majority of industrial applications.

According to claim 1, said aim is achieved by a process for separating a gaseous or liquid mixture by means of a separating device including a first volume and a second volume which are separated by a membrane which has selective permeability with respect to at least two components of said mixture, the process including the steps consisting in:

a) fill up the first volume of the device with the mixture to be separated;

b) wait for a period of time $(t_2-t_1)$ which is in excess of the permeation lag time, but is insufficient to reach a state of equilibrium, during which time a fraction of each component of said mixture passes from the first to the second volume of the device through the membrane;

c) evacuate the first and the second volume of the device, as a result of which at least one first and one second cut of the mixture is obtained, having different molar compositions.

Different specific embodiments of the invention are the object of the dependent claims. In particular said step c) can comprise the following sub-steps:

c1) evacuate the second volume of the device, as a result of which a third cut of the mixture is obtained;

c2) wait for a period of time $(t_4-t_3)$, which is insufficient to reach a state of equilibrium, during which time an additional fraction of each component of said mixture passes from the first to the second volume of the device through the membrane; and c3) evacuate the first and the second volume of the device, as a result of which said first and said second cut of the mixture is obtained.

The period of time $(t_4-t_3)$ can notably be chosen such that said second cut has a molar composition which is identical to that of the mixture before separation, with a tolerance of more or less 1%. In this case, said second cut of the mixture can be recycled.

Unless indicated to the contrary, the contents and compositions of the mixtures are expressed by the molar fractions of the different components in relation to the totality of the mixture.

Other characteristics, details and advantages of the invention will become apparent when reading the description, made with reference to the accompanying drawings which are provided by way of example, and in which, respectively:

FIG. 1, already described above, shows a membrane separation module known from the prior art and being able to be used to implement the process of the invention;

Figure 2:
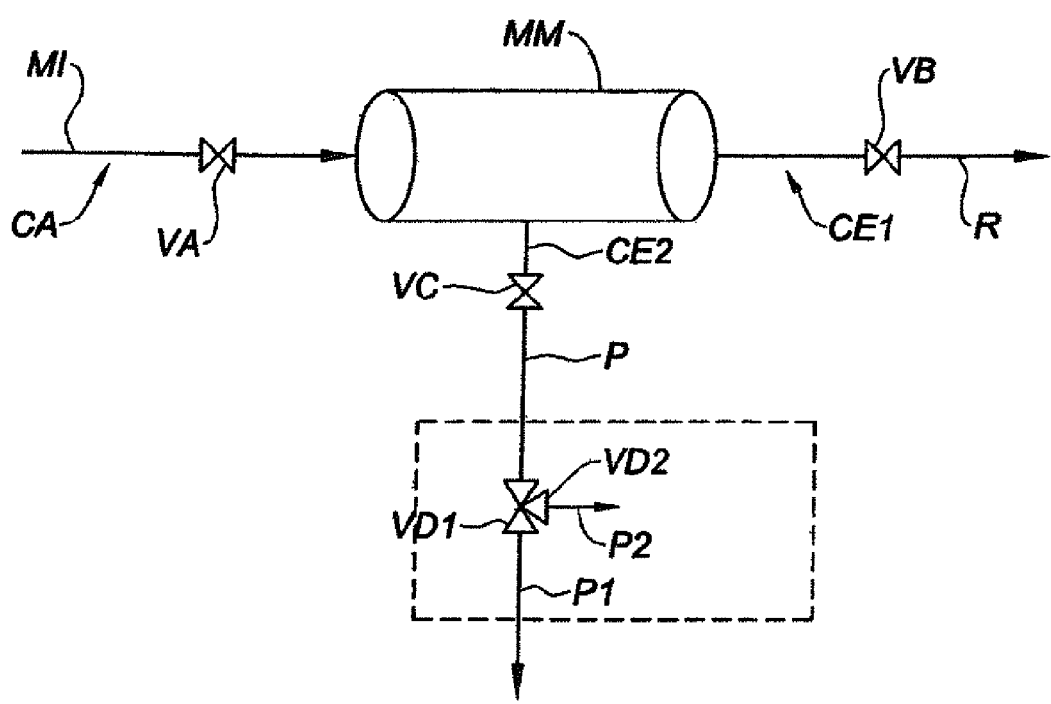
FIG. 2 shows a basic diagram of an embodiment of the process of the invention.

The process of the invention can be implements by means of the installation shown in FIG. 2, which comprises a module MM of the type described further above and a system of valves connected to the inlet and outlet ducts. Said system of valves comprises:

a first two-way valve VA, arranged on the intake duct CA, so as to control the supply of mixture to be separated MI to the module;

a second two-way valve VB, arranged on the first outlet duct CE1, so as to control the evacuation of the retentate R;

a third two-way valve VC, arranged on the second outlet duct CE2, so as to control the evacuation of the permeate P;

an extraction unit VD1/VD2, arranged on the second outlet duct CE2 downstream of the third valve VC, in order to separate a first and second permeate P1, P2. It can be made up by two two-way valves, VD1 and VD2, or by one single three-way valve—in which case the references VD1 and VD2 indicate the two paths downstream.

In a simplified embodiment of the installation, it is possible for the extraction unit VD1/VD2 not to be present. If this is the case, the valve VC is the one that can be omitted.

One process according to a first embodiment of the invention does not use the extraction unit, but just the valves VA, VB, VC (as a variant, one path of the extraction unit—VD1 or VD2—could be used in place of VC). Said process brings about two cuts of the initial mixture: a permeate or "downstream flow" P and a retentate or "upstream flow" R, and includes the following steps:

At the initial moment, $t_0$, the inlet valve VA is open in order to allow the gaseous mixture MI to be supplied from the upstream volume V1 of the module MM; the outlet valves VB and VC are closed. With the aim of simplicity, the mixture MI will be considered to be binary and its components to have different coefficients of diffusion.

Once the supply is completed, when the pressure inside the volume V1 is stabilized—the moment $t_1$—the valve VA is closed. The module MM is therefore isolated. During a period of time $(t_2-t_1)$, a permeation of the mixture MI contained in the upstream volume V1 toward the downstream volume V2 through the membrane MS is produced.

At the moment $t_2$, the valves VB and VC are opened to allow the permeate and the retentate remaining in the upstream volume V1 to be evacuated, whilst the valve VA remains closed.

Then, at the moment $t_3$, the outlet valves VB and VC are closed, the inlet valve VA is opened again and the cycle restarts.

Figure 3A:
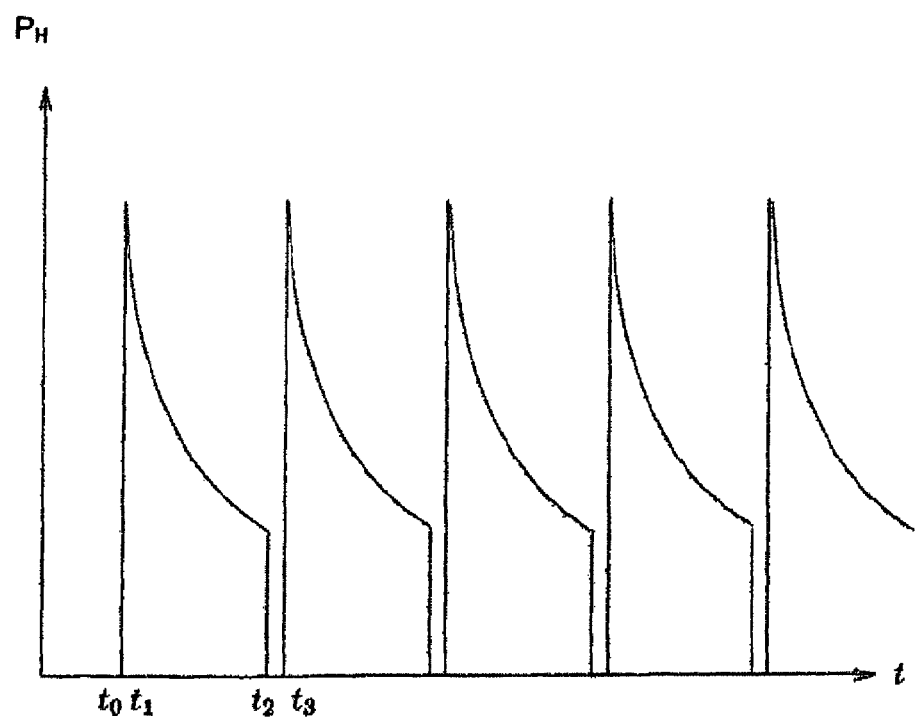
FIGS. 3A and 3B show graphs illustrating the development in time of the upstream pressure in two processes according to two different embodiments of the invention.
Figure 3B:
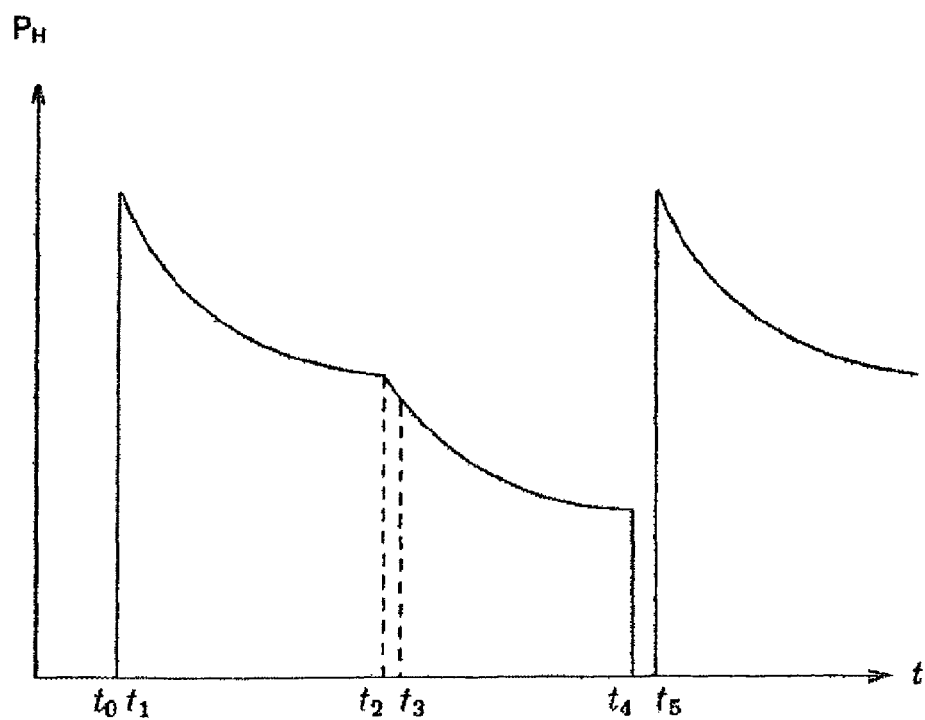

The graph in FIG. 3A shows the development of the upstream pressure (in the volume V1) during said process. With the aim of simplicity, instantaneous filling and emptying of volumes V1 and V2 have been considered; as a result $t_0=t_1$; $t_2$ and $t_3$ are kept distinct with the aim of clarity in the graph. Such an approximation is reasonable if the permeation time is at least ten times in excess of that of the filling time and of the emptying time.

Figure 13:
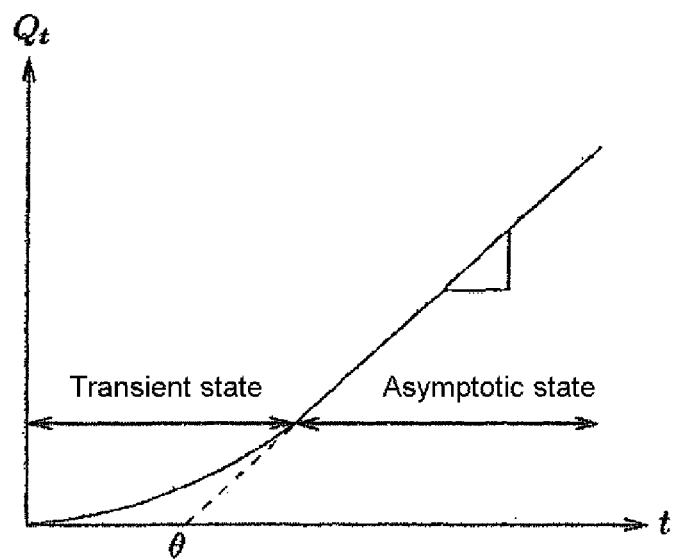
FIG. 13 illustrates the concept of "permeation lag time"

Contrary to what happens in the aforementioned process by D. R. Paul, the period of time $(t_2-t_1)$ is in excess of the permeation time lag (or simply time lag). This is a concept that is well known in the area of membrane separation processes, which is recalled here by means of FIG. 13. A membrane is considered to be initially empty, separating an upstream volume and a downstream volume. In the upstream volume, a pure gas is introduced at a constant pressure $p_u$ whilst the downstream volume is initially under a vacuum (pressure $p_d=0$). FIG. 13 shows the accumulation $Q_t$ of the permeate in the downstream volume as a function of the time t. When the permeation time is short, clearly less than the equilibrium time, the downstream pressure is low and the gap between the upstream/downstream pressure is quasi constant: $p_u-p_d \approx p_u$. The curve recorded during said period includes a non-linear part, corresponding to a transient state, and a linear asymptote. The intersection $\theta$ between the linear asymptote and the time axis is called the "time lag" and characterizes the period of time of the transient state. The value of $\theta$ depends on both the membrane and the chemical nature of the gas contained in the upstream volume; in the case of a mixture, the time lag corresponding to the most permeable component is retained.

A large difference between the two regimes is that the permeation is dominated essentially by the diffusivity in the transient regime, whilst in the asymptotic regime it is dominated by the permeability.

In the aforementioned process by D. R. Paul, the length of time the high pressure is applied is less than the time lag. Quite the reverse in the process of the invention, the length of time the high pressure is applied is in excess of the time lag, so that the permeation is dominated by the permeability. In other words, in a process according to the invention the permeation time is not sufficient to obtain equilibrium, but is sufficient to obtain the asymptotic state of the permeation.

As explained further above, the composition of the permeate which progressively fills the volume V2 varies during the permeation interval $(t_2-t_1)$: initially, said permeate contains, almost exclusively, the component of the mixture MI which has the greatest permeability; then, its composition nears the equilibrium composition, which is identical to that of the initial mixture MI. It is understood, therefore, that the composition of the permeate extracted in the interval $t_2-t_3$ can be adjusted by controlling the period of time of said interval. If $(t_2-t_1)$ is very short in relation to the time necessary to obtain equilibrium (although in excess of the time lag), a very pure permeate will be obtained, but a very low quantity thereof; the enrichment in the component with increased permeability will be large, but its rate of recovery will be low. By increasing the length of the permeation interval the rate of recovery can be increased at the detriment of the enrichment rate.

In theory, equilibrium is only obtained after an infinite time. In practice, it can be considered as such when the relative difference between the partial pressures $p_i$ of each component "i" of the mixture (the concentrations $c_i$ in the case of a liquid mixture) upstream and downstream of the membrane is less than or equal to a predefined value—for example 0.1%:

$$\frac{|p_i(amont) - p_i(aval)|}{p_i(amont)} \leq 0,1\%$$

Said process is of interest when the wish is to extract the component which has the greatest permeability from the mixture; the useful product of the process is therefore the permeate P. It is also of interest when the wish is to extract from the mixture the component having the greatest permeability; the useful product of the process is therefore the retentate R.

A second embodiment of the invention, having greater flexibility, uses the extraction unit in order to create three cuts from the incoming mixture: a retentate or "upstream flow" R, a first permeate or "downstream flow" P1 and a second permeate or "extraction flow" P2. The useful product can be any one of said three cuts, even two of them, or even the three cuts together. However, it is necessary to note that the individual quality (purity or productivity) of a cut is reduced as the number of useful cuts increases.

Said process includes the following steps:

At the initial moment, $t_0$, the inlet valve VA is open in order to allow the gaseous mixture MI to be supplied from the upstream volume V1 of the module MM; the outlet valve VB and the two paths VD1/VD2 of the extraction unit are closed (it is considered that the valve VC is absent, or always open, or open when one of the two paths of the extraction unit is open, said different options being equivalent). With the aim of simplicity, the mixture MI will be considered to be binary and its components to have different coefficients of diffusion.

Once the supply is completed, when the pressure inside the volume V1 is stabilized—the moment $t_1$—the valve VA is closed. The module MM is therefore isolated. During a period of time $(t_2-t_1)$, permeation of the mixture MI contained in the upstream volume V1 toward the downstream volume V2 through the membrane MS is produced.

At the moment $t_2$, the path VD2 of the extraction unit is re-opened to allow the extraction flow P2 to be evacuated, whilst the path VD1 and the valves VA and VB remain closed.

At the moment $t_3$, the path VD2 of the extraction unit is re-closed; the module MM is therefore isolated again and the permeation through the membrane continues for an interval $(t_4-t_3)$.

At the moment $t_4$, the path VD1 of the extraction unit and the valve VB are opened in order to allow the permeate P1 and the retentate R to be extracted.

Then, at the moment $t_5$, the valve VB is closed, as well as the path VD1 of the extraction unit, whilst the inlet valve VA is open and the cycle restarts.

The periods of time of the permeation $(t_2-t_1)$ and $(t_4-t_3)$ are both in excess of the permeation time lag.

The graph in FIG. 3A shows the development of the upstream pressure (in the volume V1) during said process. With the aim of simplicity, instantaneous filling and emptying of volumes V1 and V2 have been considered; as a result $t_0=t_1$; $t_5$ and $t_4$ are kept distinct with the aim of clarity in the graph. Such an approximation is reasonable if the periods of permeation time are at least ten times in excess of those of the filling time and of the emptying times.

It is understood that the composition of the extraction flow depends on the period of time of the first permeation interval $(t_2-t_1)$, whilst that of the permeate P1 and of the retentate R depend on both $t_2-t_1$ and $(t_4-t_3)$. There is therefore an additional degree of freedom to optimize the process. Optimization can be effected, notably, by means of a genetic algorithm aiming to maximize or minimize a criterion depending on both the rate of recovery of a component of the mixture in one of the cuts P1, P2 or R, and on the enrichment of said cut in said same component. Optimization can be constrained.

It is equally possible to choose the permeation intervals such that the downstream flow P1 has the same composition as the initial mixture MI, typically at close to 1% (in molar fraction), and can be recycled, that is to say re-injected into the module MM through the inlet duct CA. Under these conditions, supposing that the initial mixture is binary, the upstream flow (retentate) R is enriched in the component having the lowest permeability and the extraction flow P2 is enriched in the component having the greatest permeability; there is therefore no useless flow. A variant of the process which implements said recycling in a more efficient manner as regards energy will be described further below with reference to FIGS. 14 and 15A-15I.

Digital simulations have been carried out so as to validate the two embodiments of the invention—with and without extraction—applied to processes which are of real industrial interest: $O_2/CO_2$ separation; $O_2/N_2$ separation; $He/CH_4$ separation.

The conditions of the $O_2/CO_2$ separation are given below:
Membrane type: Poly(vinyl-benzoate). See: J. Brandrup and E. H. Immergut. "Polymer Handbook "3rd edition, Wiley, New York, 1989.
Membrane thickness: 1 μm.
Temperature: 297.15 K.
Upstream pressure ($P_H$): $10 \cdot 10^5$ Pa.
Downstream pressure ($P_L$): 0 Pa.
Hollow fiber length: 1 m.
Hollow fiber inside diameter: 50 μm.
Hollow fiber number: 6 366 203.
Membrane inside surface: 1000 m$^2$.
Upstream volume capacity CV1: 0.0125 m$^3$.
Downstream volume capacity CV2: several cases are considered: CV2={0,1; 1; 10; 100; 1000; 10000}·CV1.

|  | $O_2$ | $CO_2$ |
|---|---|---|
| Diffusivity | $7.9 \cdot 10^{-12}$ m$^2$/s | $2.0 \cdot 10^{-12}$ m$^2$/s |
| Solubility | $9.1 \cdot 10^{-7}$ Pa$^{-1}$ | $2.09 \cdot 10^{-5}$ Pa$^{-1}$ |
| Initial molar fraction | 0.5 | 0.5 |

Figure 4:
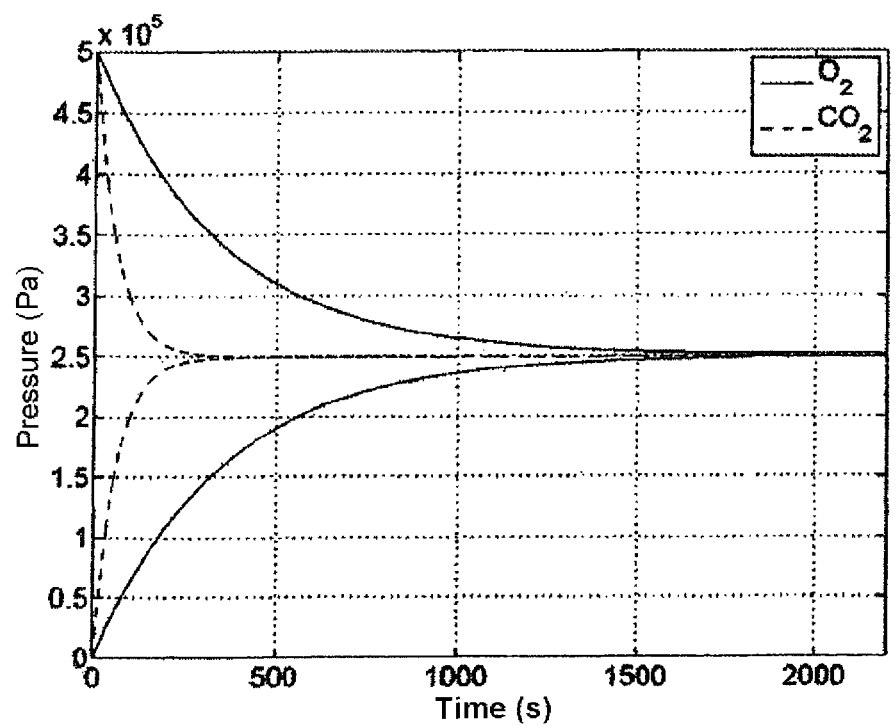
FIGS. 4 to 6 show graphs illustrating the application of a process according to an embodiment of the invention with $O_2/CO_2$ separation.

FIG. 4 shows the development of the part pressures of the two components of the mixture on the two sides of the membrane for the case CV2/CV1=1. The period of time necessary to obtain equilibrium is about 2200 s.

Figure 5:
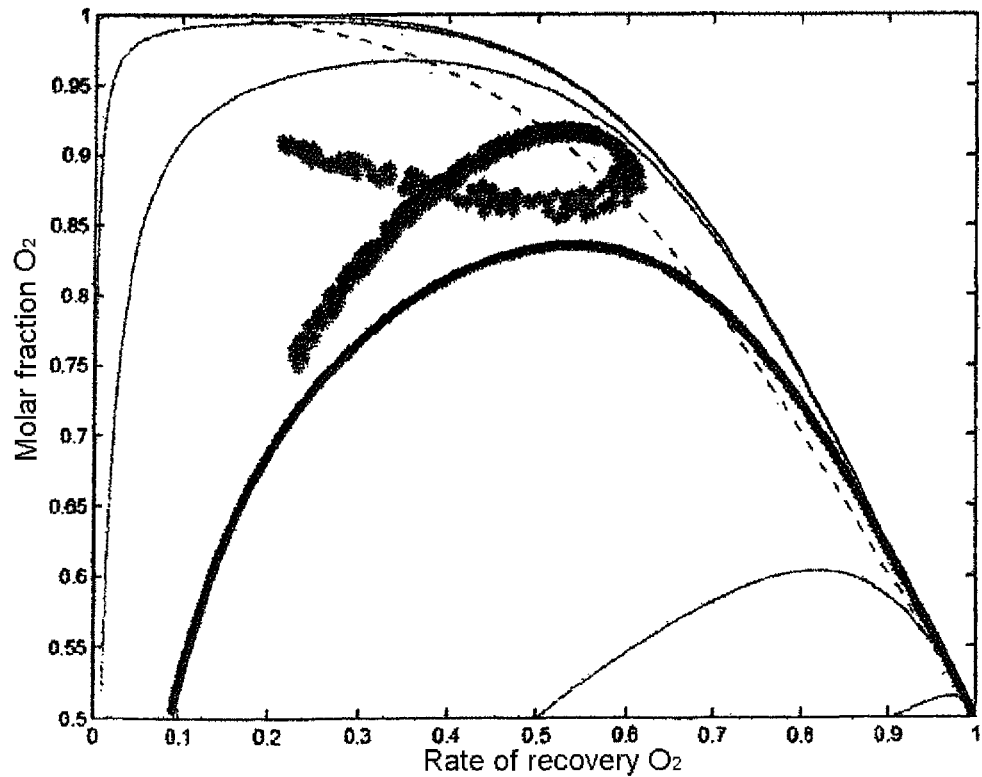

FIG. 5 shows the compromise between the enrichment of the retentate in $O_2$ and the rate of recovery in $O_2$ for different processes:

the continuous curves correspond to processes according to the first embodiment of the invention (without extraction) for different values of the ratio CV2/CV1: 0.1; 1; 10 (thick line); 100; 1000; 10000;

the asterisks correspond to a process according to the second embodiment of the invention (with extraction) in the case CV2/CV1=10, with the constraint that the downstream flow is equimolar (that it therefore has the same composition as the initial mixture);

the dotted line curve corresponds to a RPA type continuous process (parameters identical to those of the process according to the invention, except for the downstream pressure which is equal to 0.1 times the upstream pressure; the ratio CV2/CV1 does not influence a continuous process);

the curve in broken lines corresponds to a crossed current type continuous process (parameters identical to those of the RPA process; here too, the ratio CV2/CV1 is not important).

The curves are parameterized by the permeation time. The table below makes the connection between the period of time of the cycle $(t_2-t_1)$ and the $O_2$ rate of recovery for the case CV2/CV1=10:

| $O_2$ rate of recovery | Permeation time (s) |
|---|---|
| 1.0 | 0 |
| 0.9 | 74.3 |
| 0.8 | 155.3 |
| 0.7 | 255.1 |
| 0.6 | 369.2 |
| 0.5 | 508.5 |
| 0.4 | 686.8 |
| 0.3 | 935.8 |
| 0.2 | 1350 |

It is advisable to note that the retentate is enriched in $O_2$, as oxygen is the component of the mixture which has the lowest permeability.

For the process with extraction, simulations were carried out for 17085 different combinations of time $t_i$, i=1-5 generated in a random manner. Combinations allowing a downstream flow to be produced with a molar composition that is identical to the feed flow at close to 1% have been retained.

It can be verified that the invention, as much in its version with extraction as in its version without extraction, allows greater enrichment to be obtained compared to processes operating in permanent regime, and without sacrificing the rate of recovery. In the specific case considered here, this is all the more surprising as $O_2$ and $CO_2$ have comparable diffusivities and very different solubilities—a circumstance which would seem to have to favor the continuous processes.

Figure 6:
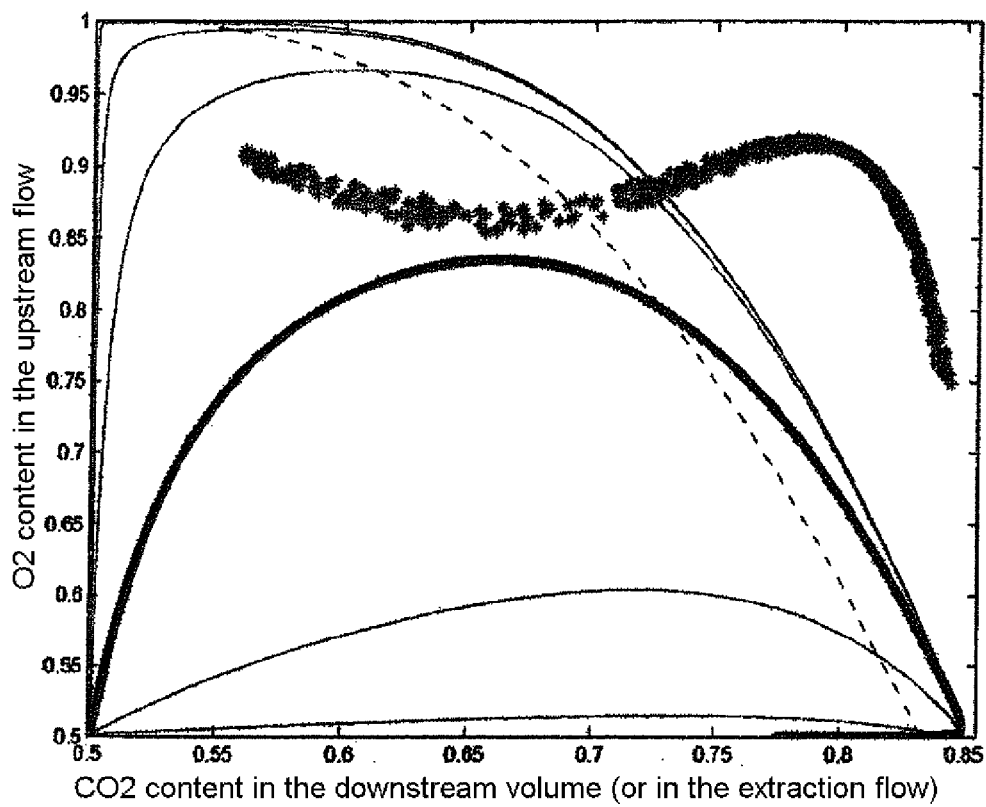

The advantages of the invention appear even more clearly in FIG. 6 which allows the powers of separation of the different processes to be compared. It can be seen that the process with extraction allows a retentate containing more than 90% oxygen and an extraction flow containing more than 80% $CO_2$ to be obtained at the same time. For example, it is possible to obtain a content in $CO_2$ of 0.79 in the extraction flow and a content in $O_2$ of 0.92 in the upstream volume with a cycle of a duration equal to 505 s (seconds), with $(t_4-t_3)=377$ s; $(t_3-t_2)=9$ s; $(t_2-t_1)=119$ s.

The conditions of the $O_2/N_2$ separation are given below:
Membrane type: Polycarbonate with SBIPI (Spirobiindane polycarbonate) between the bisphenol groupings. See: W. J. Koros and G. K. Fleming <<Membrane-based gas separation>> J. Membr. Sci., 83:1-80, 1993.
Membrane thickness: 1 µm.
Temperature: 297.15 K.
Upstream pressure ($P_H$): $10 \cdot 10^5$ Pa.
Downstream pressure ($P_L$): 0 Pa.
Hollow fiber length: 1 m.
Hollow fiber internal diameter: 50 µm.
Hollow fiber number: 6 366 203.
Membrane inside surface: 1000 m².
Upstream volume capacity CV1: 0.0125 m³.
Downstream volume capacity CV2: several cases are considered: CV2={0.1; 1; 10; 100; 1000; 10000}·CV1.

|  | $O_2$ | $N_2$ |
|---|---|---|
| Diffusivity | $1.1 \cdot 10^{-11}$ m²/s | $2.82 \cdot 10^{-12}$ m²/s |
| Solubility | $2.13 \cdot 10^{-4}$ Pa⁻¹ | $1.64 \cdot 10^{-4}$ Pa⁻¹ |
| Initial molar fraction | 0.5 | 0.5 |

Figure 7:
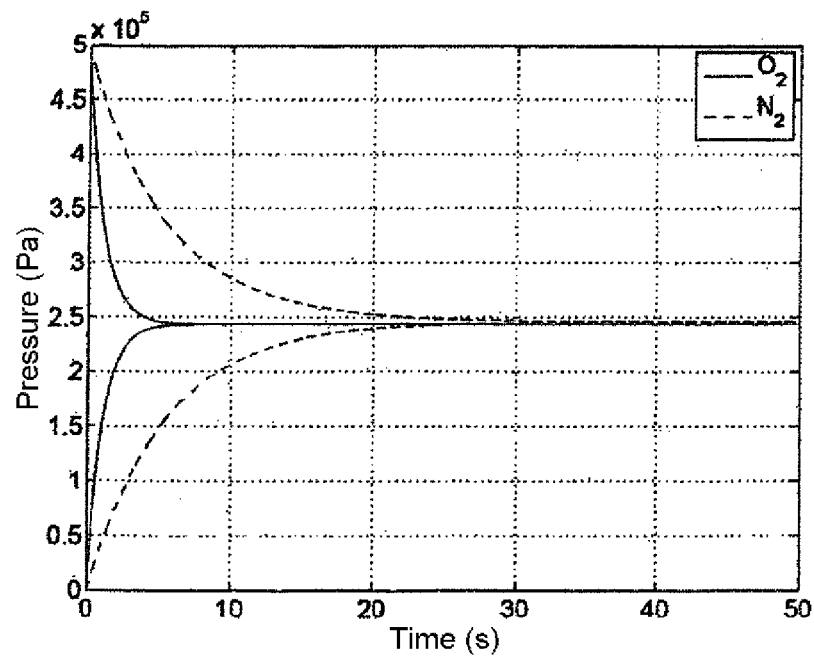
FIGS. 7 to 9 show graphs illustrating the application of a process according to an embodiment of the invention with $O_2/N_2$ separation.

FIG. 7 shows the development of the part pressures of the two components of the mixture on the two sides of the membrane for the case CV2/CV1=1. The period of time necessary to obtain equilibrium is about 50 s.

Figure 8:
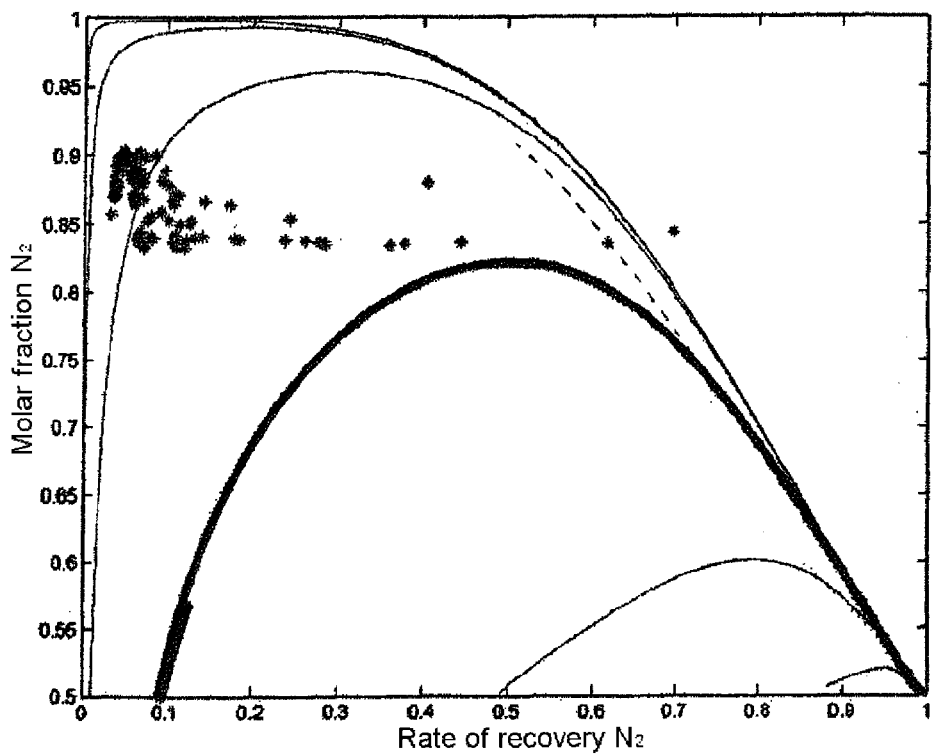

FIG. 8 shows the compromise between the enrichment of the retentate in $N_2$ and the rate of recovery in $N_2$ for different processes. As in the case of FIG. 5:
the continuous curves correspond to processes according to the first embodiment of the invention (without extraction) for different values of the ratio CV2/CV1: 0.1; 1; 10 (thick line); 100; 1000; 10000;
the asterisks correspond to a process according to the second embodiment of the invention (with extraction) in the case CV2/CV1=10, with the constraint that the downstream flow is equimolar (that it therefore has the same composition as the initial mixture);
the dotted line curve corresponds to a RPA type continuous process;
the curve in broken lines corresponds to a crossed current type continuous process.

The curves are parameterized by the permeation time.

The table below makes the connection between the period of time of the cycle ($t_2-t_1$) and the $N_2$ rate of recovery for the case CV2/CV1=10:

| $N_2$ rate of recovery | Permeation time(s) |
|---|---|
| 1.0 | 0 |
| 0.9 | 0.2 |
| 0.8 | 0.46 |
| 0.7 | 0.77 |
| 0.6 | 1.12 |
| 0.5 | 1.56 |
| 0.4 | 2.12 |
| 0.3 | 2.90 |
| 0.2 | 4.19 |

For the process with extraction, simulations were carried out for 19168 different combinations of time $t_i$, i=1-5 generated in a random manner. Combinations allowing a downstream flow to be produced with a molar composition that is identical to the feed flow of close to 1% have been retained. As in the case of the $O_2/CO_2$ separation, it can be verified that the invention, as much in its version with extraction as in its version without extraction, allows a greater enrichment to be obtained compared to processes operating in permanent regime, and without sacrificing the recovery rate.

Figure 9:
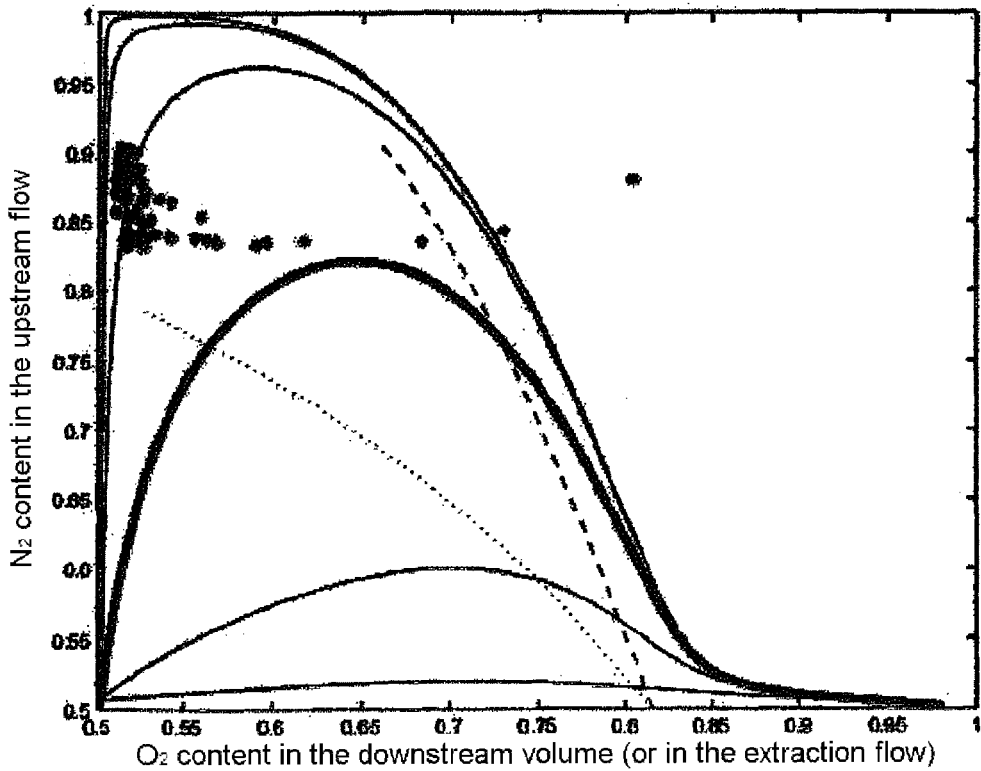

FIG. 9 enables the powers of separation of different processes to be compared. It can be seen that the process with extraction allows a retentate containing more than 85% nitrogen and an extraction flow containing more than 75% oxygen to be obtained at the same time. For example, it is possible to obtain a content in $O_2$ of 0.80 in the extraction flow and a content in $N_2$ of 0.88 in the upstream volume with a cycle with a duration equal to 11 s, with $(t_4-t_3)=9.6$ s; $(t_3-t_2)=1.3$ s; $(t_2-t_1)=0.1$ s.

The conditions of the He/$CH_4$ separation are given below:
Membrane type: Poly(ethylene), high density, 0.964 g·cm⁻³ HDPE. See: J. Brandrup and E. H. Immergut. "Polymer Handbook" $3^{rd}$ edition, Wiley, New York, 1989.
Membrane thickness: 0.1 µm.
Temperature: 297.15 K.
Upstream pressure ($P_H$): $10 \cdot 10^5$ Pa.
Downstream pressure ($P_L$): 0 Pa.
Hollow fiber length: 1 m.
Hollow fiber inside diameter: 50 µm.
Hollow fiber number: 6 366 203.
Membrane inside surface: 1000 m².
Upstream volume capacity CV1: 0.0125 m³.
Downstream volume capacity CV2: several cases are considered: CV2={0.1; 1; 10; 100; 1000; 10000}·CV1.

|  | He | $CH_4$ |
|---|---|---|
| Diffusivity | $3.07 \cdot 10^{-10}$ m²/s | $5.7 \cdot 10^{-12}$ m²/s |
| Solubility | $2.8 \cdot 10^{-8}$ Pa⁻¹ | $5.1 \cdot 10^{-7}$ Pa⁻¹ |
| Initial molar fraction | 0.5 | 0.5 |

Figure 10:
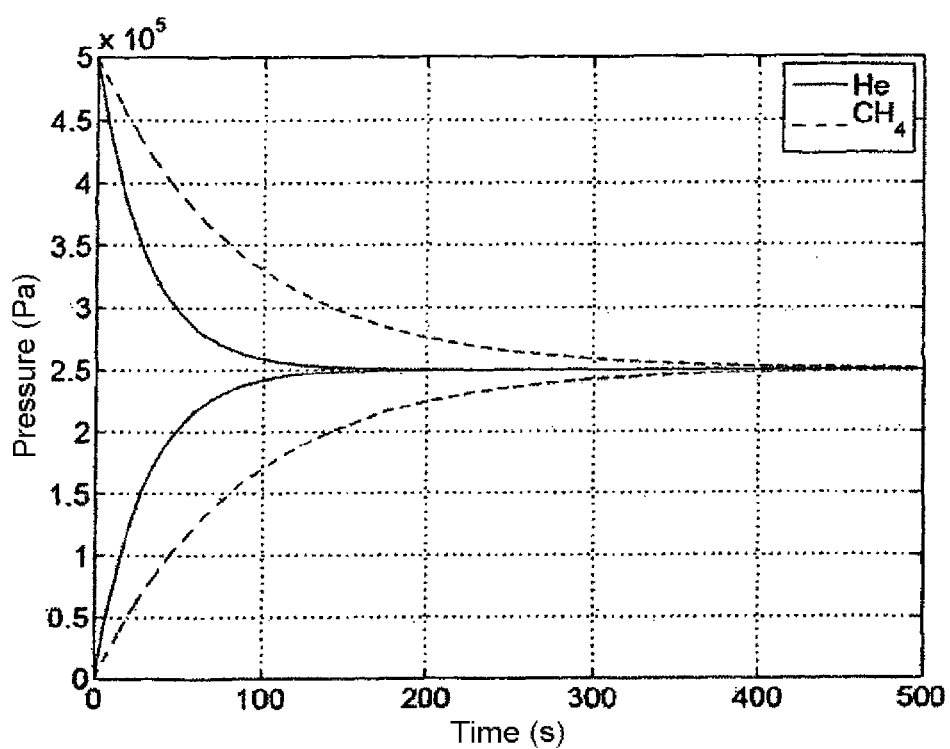
FIGS. 10 to 12 show graphs illustrating the application of a process according to an embodiment of the invention with $He/CH_4$ separation.

FIG. 10 shows the development of the part pressures of the two components of the mixture on the two sides of the membrane for the case CV2/CV1=1. The period of time necessary to obtain equilibrium is about 500 s.

Figure 11:
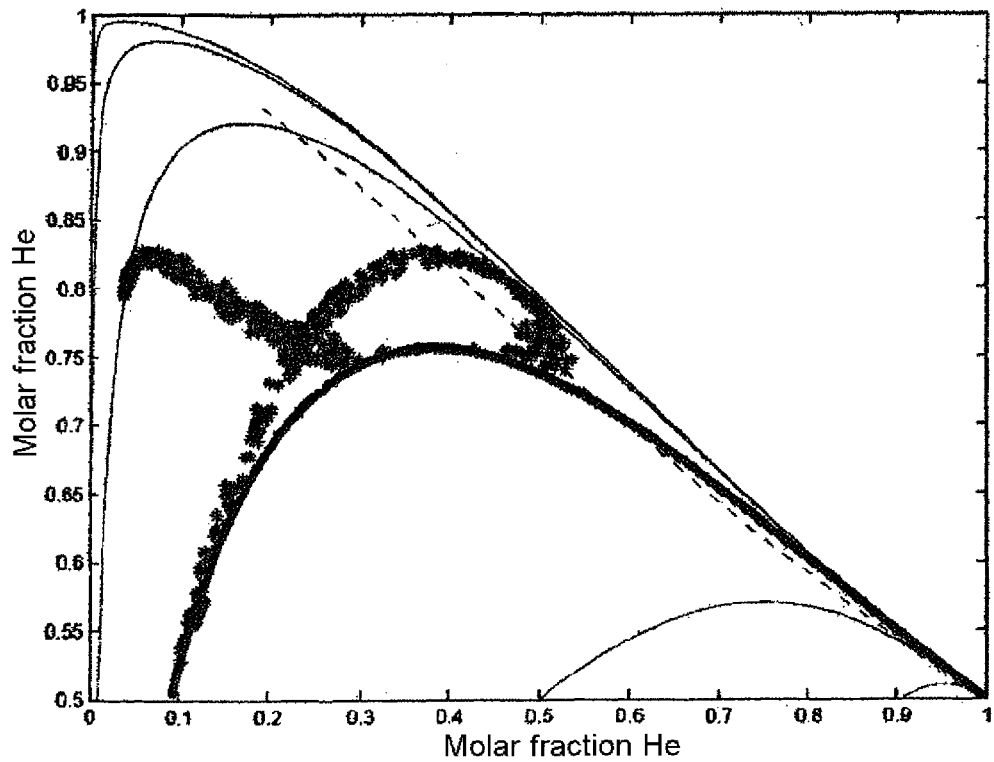

FIG. 11 shows the compromise between the enrichment of the retentate in He and the rate of recovery in He for different processes. As in the case of FIG. 5:
the continuous curves correspond to processes according to the first embodiment of the invention (without extraction) for different values of the ratio CV2/CV1: 0.1; 1; 10 (thick line); 100; 1000; 10000;
the asterisks correspond to a process according to the second embodiment of the invention (with extraction) in the case CV2/CV1=10, with the constraint that the downstream flow is equimolar (that it therefore has the same composition as the initial mixture);

the dotted line curve corresponds to a RPA type continuous process;

the curve in broken lines corresponds to a crossed current type continuous process.

The curves are parameterized by the permeation time.

The table below makes the connection between the period of time of the cycle $(t_2-t_1)$ and the $O_2$ recovery rate for the case CV2/CV1=10:

| He rate of recovery | Permeation time (s) |
|---|---|
| 1.0 | 0 |
| 0.9 | 6.3 |
| 0.8 | 13.5 |
| 0.7 | 21.8 |
| 0.6 | 31.6 |
| 0.5 | 43.5 |
| 0.4 | 58.7 |
| 0.3 | 80 |
| 0.2 | 115.5 |

For the process with extraction, simulations were carried out for 17586 different combinations of time $t_i$, i=1-5 generated in a random manner. The combinations allowing a downstream flow to be produced with a molar composition that is identical to the feed flow of close to 1% have been retained. As in the case of the $O_2/CO_2$ separation, it can be verified that the invention, as much in its version with extraction as in its version without extraction, allows a greater enrichment to be obtained compared to processes operating in permanent regime, and without sacrificing the recovery rate. In particular, the process with extraction allows almost 50% of the helium present in the initial mixture to be recovered, with 80% purity.

Figure 12:
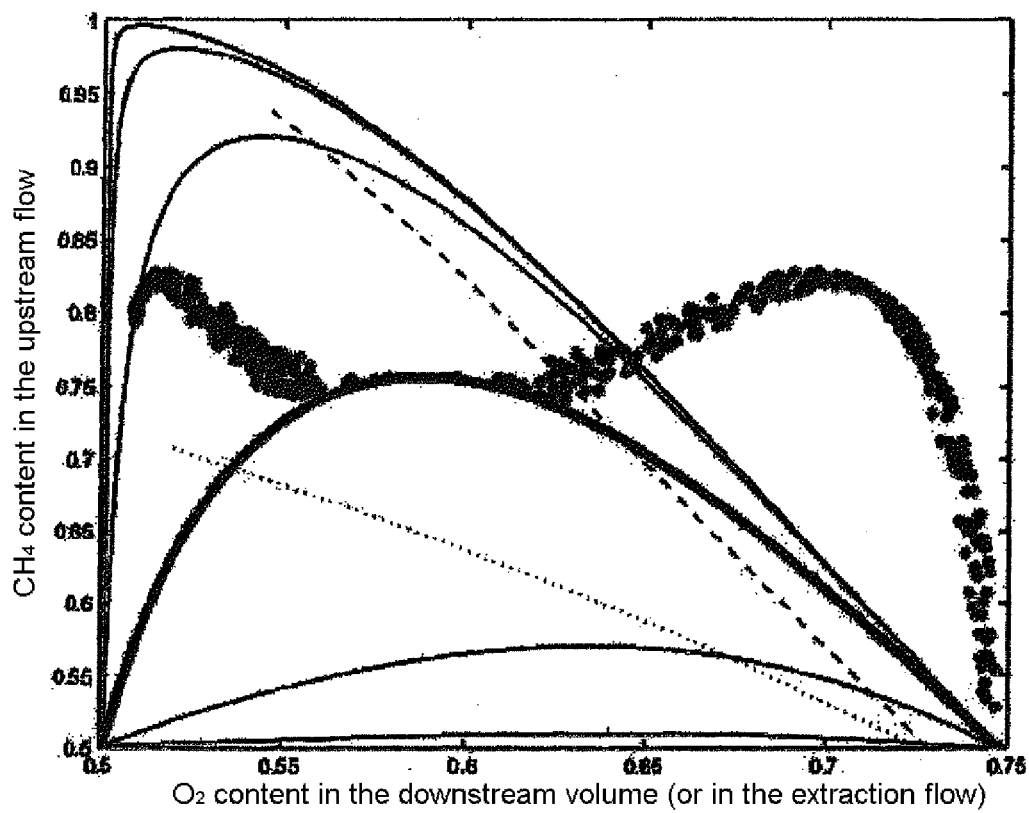

FIG. 12 enables the powers of separation of different processes to be compared. It can be seen that the process with extraction allows an extraction flow containing more than 70% helium and a retentate containing more than 80% methane to be obtained at the same time. For example, it is possible to obtain a content in He of 0.70 in the extraction flow and a content in $CH_4$ of 0.83 in the upstream volume with a cycle with a duration equal to 191 s, with $(t_4-t_3)$=145 s; $(t_3-t_2)$=5 s; $(t_2-t_1)$=41 s.

The invention has been described with reference to its application to the separation of gaseous mixtures using compact (non porous) membranes. However, it is equally applicable to processes which implement porous membranes and/or to the separation of liquid mixtures.

The recycling of a downstream flow P1, which has a composition that is appreciably identical to that of the initial mixture, is particularly advantageous as it avoids all losses of material. However, if it is realized by re-injecting said downstream flow P1 into the module MM through the inlet duct CA, it requires compression which uses a lot of energy. FIGS. 15A-15I show a process which allows said recycling to be realized in a manner that is more energy-economical, by means of an installation that is shown schematically in FIG. 14.

Figure 1:
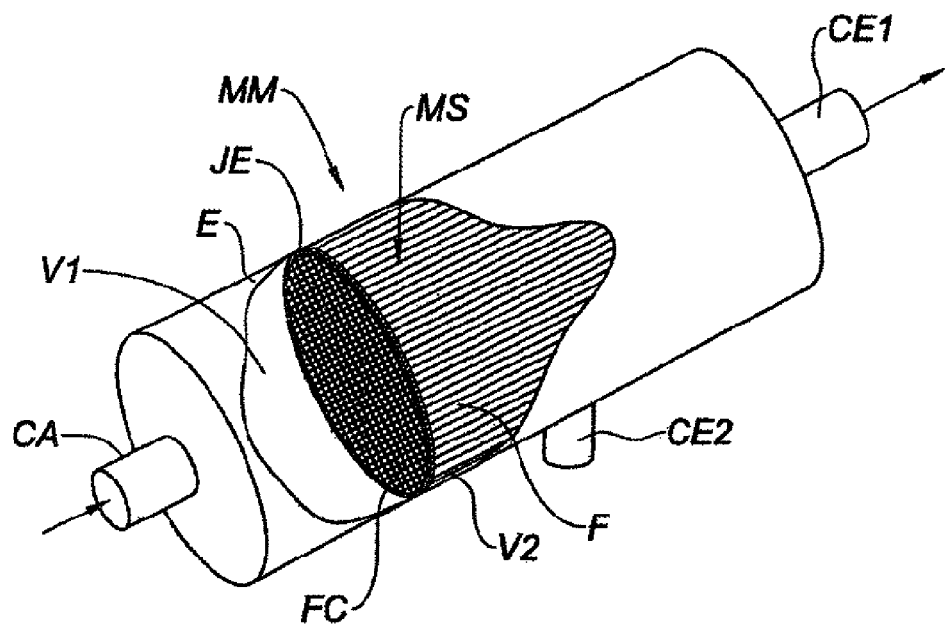
Figure 14:
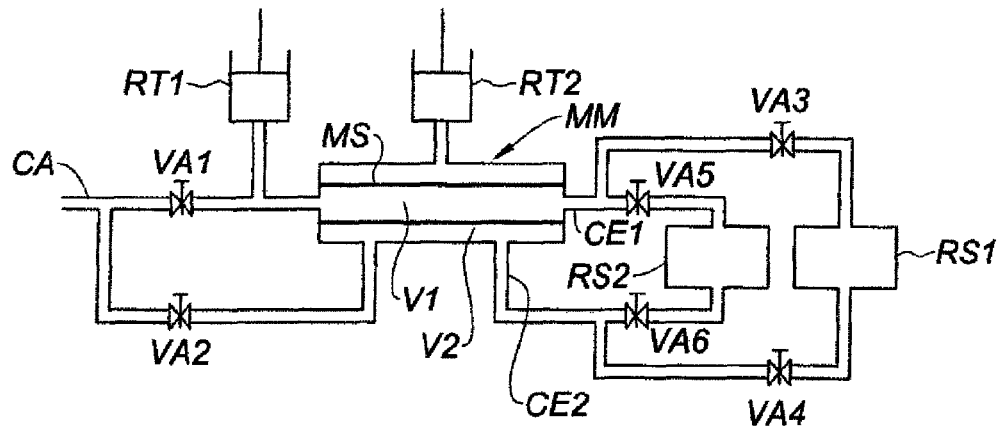
FIG. 14 shows a schematic representation of an installation for implementing a process according to an embodiment of the invention.

The installation of FIG. 14 includes:

a first valve VA1 arranged between the inlet duct CA and the first volume V1 of the module MM, which is the type described further above with reference to FIG. 1;

a first buffer tank RT1 arranged downstream of said first valve VA1 so as to be connected fluidically to said first volume V1; the capacity of the buffer tank RT1 can vary between a minimum value and a maximum value thanks, for example, to a piston;

a second valve VA2 arranged on a branch circuit connecting the inlet duct CA to the second volume V2 of the module MM;

a second buffer tank RT2 connected fluidically to said second volume V2; the capacity of the buffer tank RT2 can vary between a minimum value and a maximum value thanks, for example, to a piston;

a third valve VA3 arranged on the first outlet duct CE1, between the first volume V1 of the module MM and a first storage tank RS1;

a fourth valve VA4 arranged on the second outlet duct CE2, between the second volume V2 of the module MM and said first storage tank RS1;

a fifth valve VA5 arranged on a branch circuit of the first outlet duct CE1, between the first volume V1 of the module MM and a second storage tank RS2; and a sixth valve VA6 arranged on a branch circuit of the second outlet duct CE2, between the second volume V2 of the module MM and said second storage tank RS2.

It is clear that the valve pairs VA1/VA2, VA3/VA5 and VA4/VA6 could be realized in the form of three-way valves.

In an advantageous manner, the capacity of the assembly VA1/RT1 is in excess, by at least a factor 10, of that of the assembly VA2/RT2 when the piston of RT1 is raised and that of RT2 lowered, and vice-versa.

The valve system VA1-VA6 allows the roles of the first and of the second volume to be exchanged in a cyclical manner, whilst the buffer tanks have a double function: temporarily storing the cut P1 which is intended to be recycled and allowing the capacities of the volumes V1 and V2 to be modified such that that of the "downstream" volume is always in excess of that of the "upstream" volume in spite of said cyclical exchange.

FIGS. 15A to 15I illustrate in a detailed manner the different steps of the process implemented by means of the installation of FIG. 14.

Figure 15A:
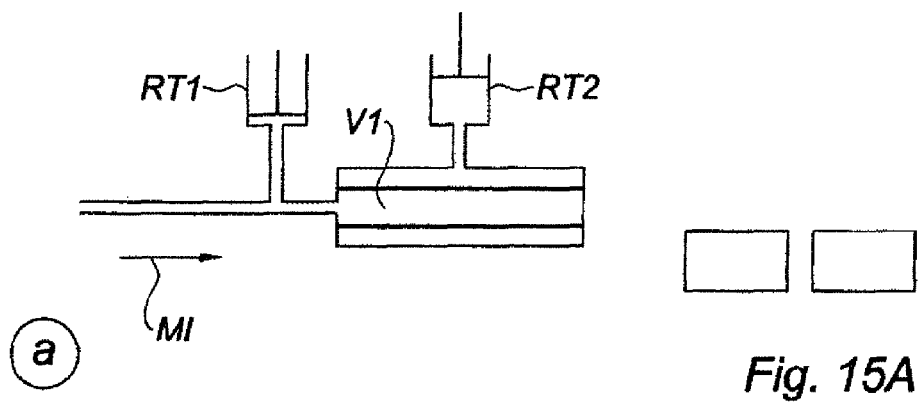
FIGS. 15A to 15I illustrate the operation of said installation.

During the initial step (a), illustrated on FIG. 15A, the valve VA1 is open whilst the other valves are closed; the piston of the first buffer tank is lowered (the capacity of RT1 therefore takes on its minimum value) and that of the second buffer tank is raised (the capacity of RT2 therefore takes on it maximum value). The mixture to be separated MI is introduced into the first volume V1 ("upstream" volume).

Figure 15B:
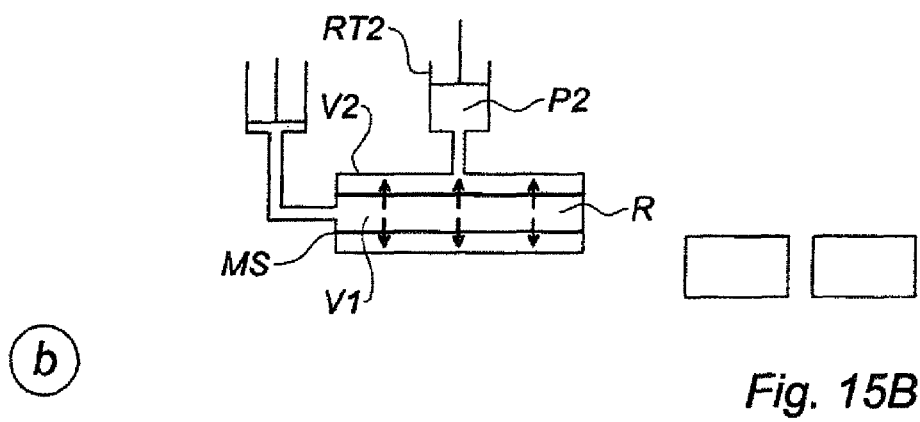

FIG. 15B illustrates the second step (b) during which all the valves are closed and the mixture diffuses through the membrane MS for a period of time $(t_2-t_1)$, as explained further above. Thus, the volume V2 and the buffer tank RT2 fill up with permeate P2 whilst the retentate R remains in the volume V1 (the capacity of the buffer tank RT1 is considered to be unimportant during said step).

Figure 15C:
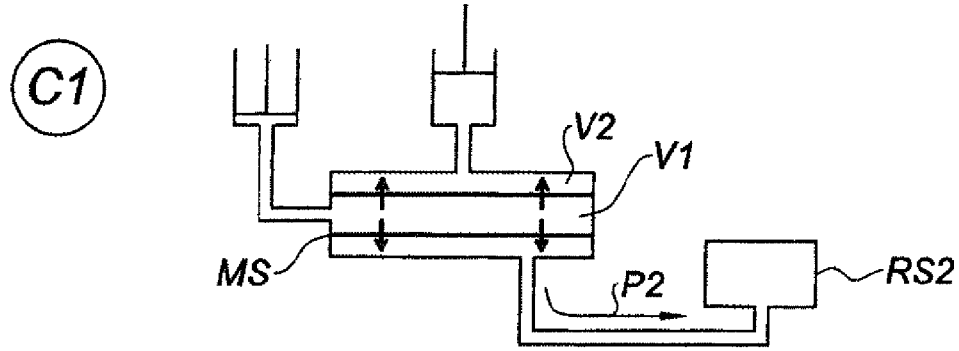
Figure 15D:
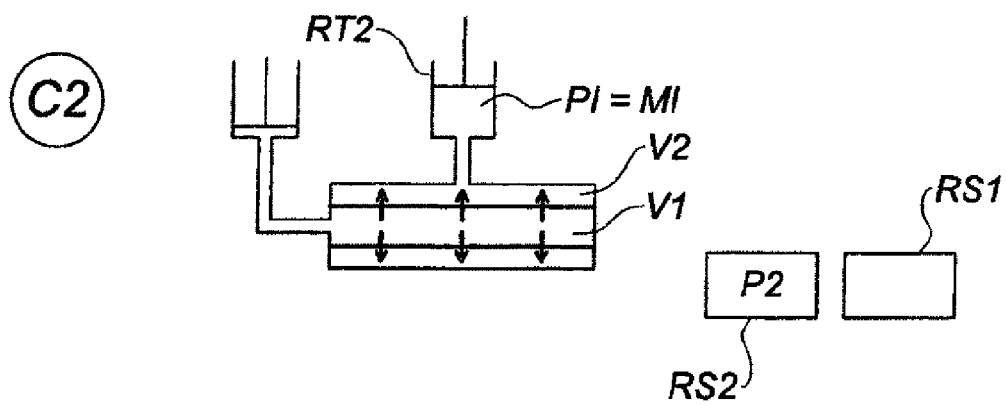

During the step (c1), illustrated by FIG. 15C, the valve VA6 is open for a brief lapse of time so as to allow for the evacuation of the volume V2/RT2 and the storage of the permeate P2 in the tank RS2.

This is followed (FIG. 15D) by a second diffusion phase (c2) of the duration $(t_4-t_3)$, during which permeation through the membrane continues, modifying the composition of the retentate R which remains in the volume V2. The permeate P1 collected during said phase which, as explained further above, has a composition that is appreciably identical to that of the initial mixture MI, is stored provisionally in the buffer tank RT2.

Figure 15E:
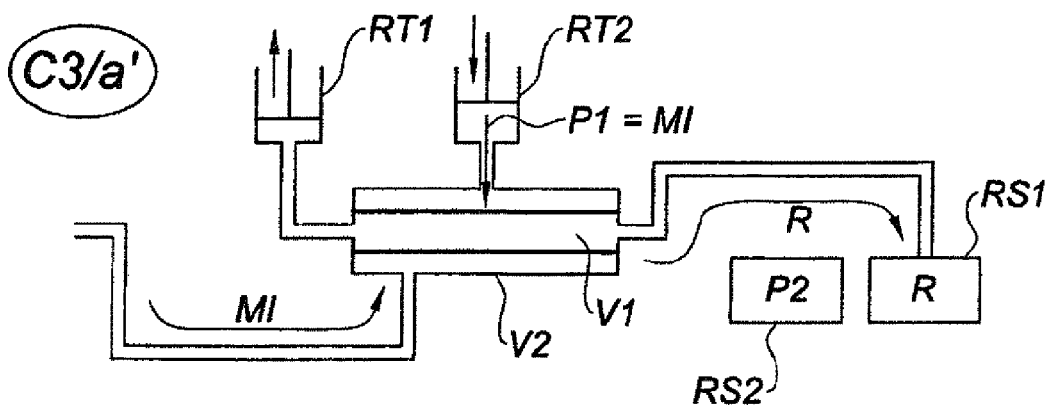

Then, as shown in FIG. 15E, the valve VA3 is opened in order to evacuate the first volume V1 and to store the retentate R in the tank RS1 (step c3). Then or at the same time (step a') the valve VA1 is opened in order to fill up the volume V1 from the mixture MI; the pistons of the buffer tanks are actuated such that the capacity of RT1 takes on its maximum value and that of RT2 its minimum value. At the end of the step (a') the situation is exactly the same as at the end of the step (a), except that the volumes V1/RT1 and V2/RT2 have exchanged roles.

Figure 15F:
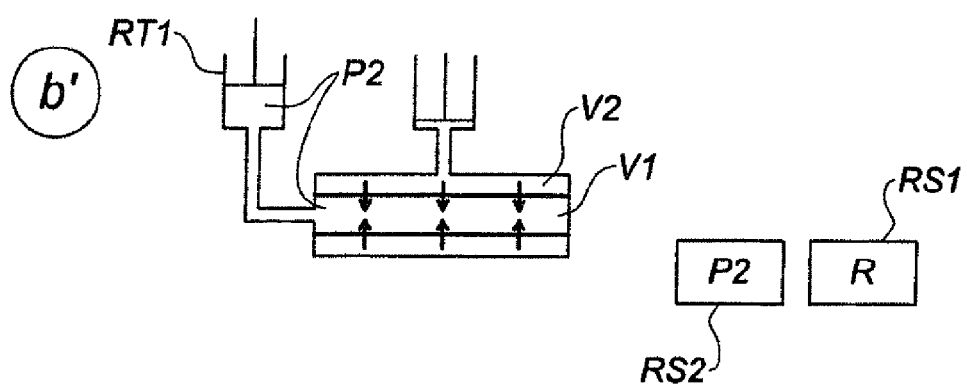

This is followed by a step (b') of permeation through the membrane MS for a period of time $(t_2-t_1)$. Said step, illustrated by FIG. 15F, is completely symmetrical to the step (b) described above.

Figure 15G:
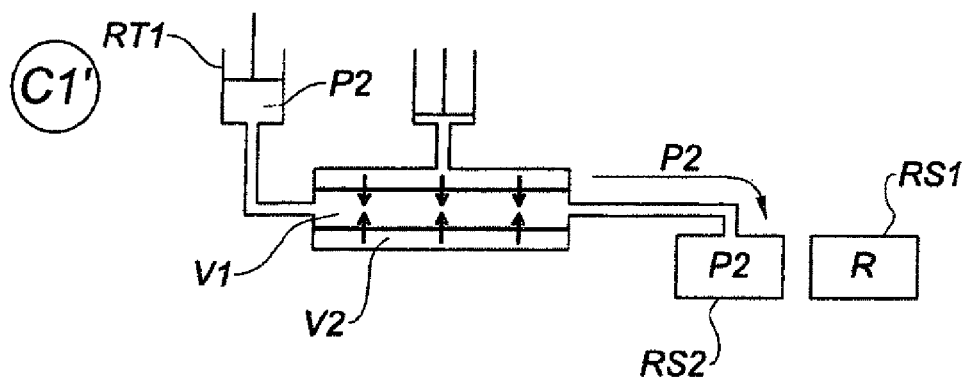

FIG. 15G shows the step (c1') during which the valve VA5 is opened in order to allow for the storage of the cut P2, which has accumulated in the volume V1/RT1, in the tank RS2.

Figure 15H:
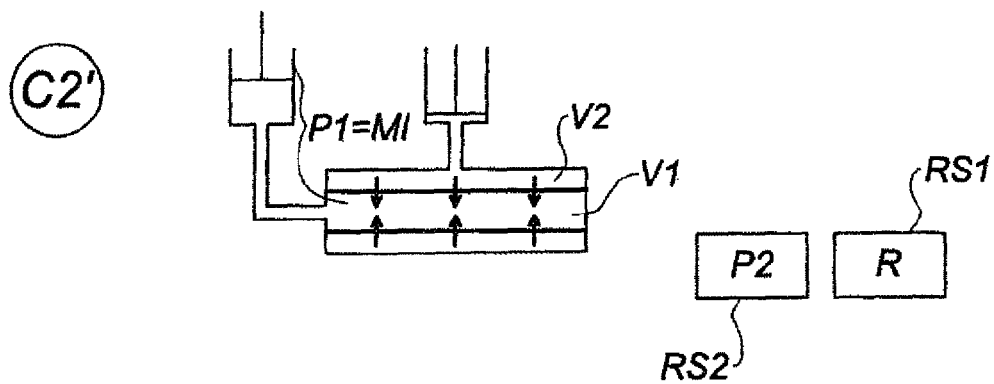
Figure 15I:
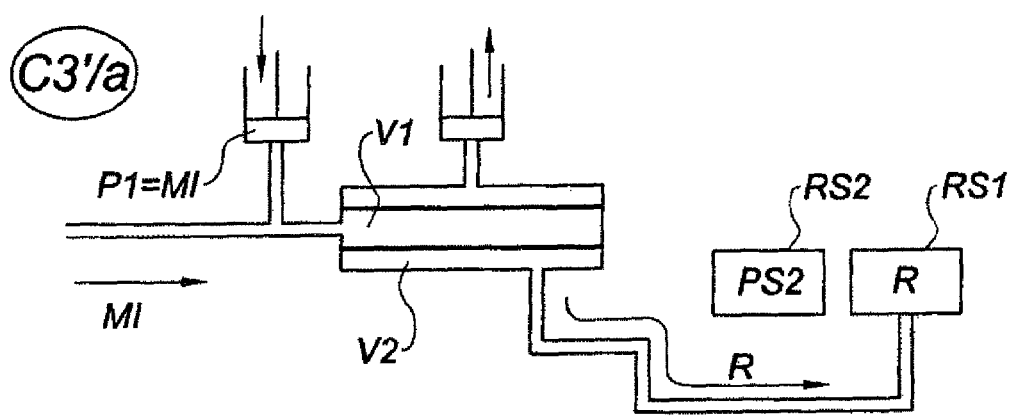

The step (c2'), illustrated by FIG. 15H, is completely symmetrical to the step (c2) described above: there is permeation for a period of time $(t_4-t_3)$, being carried out, however, from the volume V2 to the volume V1. All the valves are closed during said step.

This is followed by a step (c3') for the recovery of the retentate R, which is stored in the tank RS1, as a result of the opening of the valve VA4.

Then or at the same time, the valve VA1 is opened in order to fill up the volume V1 from the mixture MI; the pistons of the buffer tanks are actuated such that the capacity of RT2 takes on its maximum value and that of RT1 its minimum value. The situation is the same as during the step (a) and the process can restart in a cyclical manner until the mixture to be separated has been exhausted. The first and the third cut of the mixture are recovered in the tanks RS1 and RS2, respectively. It is understood that the presence of said tanks is not essential, and that they can be replaced by outlet ducts supplying said cuts outside the installation.

The invention claimed is:

1. A process of separating a gaseous or liquid mixture comprising at least two components using a separating device including a first volume (V1) and a second volume (V2) which are separated by a membrane (MS) which has selective permeability with respect to the at least two components of said mixture, wherein said process comprises the following steps:
    a) filling up the first volume of the device with the mixture (MI) to be separated;
    b) waiting for a period of time $(t_2-t_1)$ which is in excess of the permeation lag time of said membrane in contact with said mixture, but is insufficient to reach a state of equilibrium, during which time a fraction of each component of said mixture passes from the first to the second volume of the device through the membrane; and
    c) evacuating the first and the second volume of the device, as a result of which at least one first cut (R) and at least one second cut of the mixture are obtained, said at least one first cut and at least one second cut having different molar compositions.

2. The process according to claim 1, wherein said step c) comprises the following sub-steps:
    c1) evacuating the second volume of the device, as a result of which a third cut (P2) of the mixture is obtained;
    c2) waiting for a period of time $(t_4-t_3)$, which is insufficient to reach a state of equilibrium, during which time an additional fraction of each component of said mixture passes from the first to the second volume of the device through the membrane; and
    c3) evacuating the first volume of the device, and the second volume of the device obtained from step c2), as a result of which said first cut (R) and said second cut (P1) of the mixture are obtained.

3. The process according to claim 2, wherein the period of time $(t_4-t_3)$ is chosen so that said second cut (P1) has a molar composition which is identical to that of the mixture before separation, with a tolerance of more or less 1%.

4. The process according to claim 3, comprising a recycling of said second cut (P1) of the mixture.

5. The process according to claim 4, wherein said recycling is carried out by storing said second cut (P1) of the mixture in a second buffer tank (RT2) which is fluidically connected to the second volume of the device, then by implementing the steps consisting of:
    a') filling up the second volume of the device with the mixture (MI) to be separated, whilst keeping said second volume fluidically connected to said buffer tank;
    b') waiting for the period of time $(t_2-t_1)$, which is in excess of the permeation lag time but is insufficient to reach a state of equilibrium, during which time a fraction of each component of said mixture passes from the second volume to the first volume of the device through the membrane;
    c1') evacuating the first volume of the device in order to recover a third cut (P2') of the mixture;
    c2') waiting for the period of time $(t_4-t_3)$, which is insufficient to reach a state of equilibrium, during which time an additional fraction of each component of said mixture passes from the second volume to the first volume of the device through the membrane; and
    c3') evacuating the second volume in order to recover a first cut of the mixture (R) and evacuate the second volume in order to store a second cut (P1') of the mixture in a first buffer tank (RT1) which is fluidically connected to the first volume of the device;
    steps a), b), c1), c2), c3), a'), b'), c1'), c2') and c3') being then cyclically repeated.

6. The process according to claim 5, wherein said buffer tanks have variable capacities, the process comprising an adjustment of said capacities so that:
    the sum of the capacities of the first volume and of said first buffer tank is less than the sum of the capacities of the second volume and of said second buffer tank during the steps a) to c2) and
    the sum of the capacities of the second volume and of said second buffer tank is less than the sum of the capacities of the first volume and of said first buffer tank during the steps a') to c2').

7. The process according to claim 1, wherein the waiting time $(t_2-t_1)$ is chosen in order to maximize or minimize an optimization criterion for one of the least two components which depends both on the rate of recovery of said component of the mixture in one of the cuts and on the enrichment of said cut in said component.

8. The process according to claim 1, wherein no evacuation, even in part, of the first or of the second volume takes place during the waiting time $(t_2-t_1)$.

9. The process according to claim 1, wherein said mixture is a gaseous mixture.

10. The process according to claim 1, wherein said membrane (MS) is a non-porous membrane.

11. The process according to claim 1, wherein at least during the waiting time $(t_2-t_1)$, the capacity of the volume filled with the mixture to be separated is less than the capacity of the volume which receives a cut of said mixture through the membrane.

12. The process according to claim 5, wherein the waiting time $(t_2-t_1)$, $(t_4-t_3)$, $(t'_2-t'_1)$ and/or $(t'_4-t'_3)$ are chosen in order to maximize or minimize an optimization criterion for one of the least two components which depends both on the rate of recovery of said component of the mixture in one of the cuts and on the enrichment of said cut in said component.

13. The process according to claim 5, wherein no evacuation, even in part, of the first or of the second volume takes place during the waiting time $(t_2-t_1)$, $(t_4-t_3)$, $(t'_2-t'_1)$ and/or $(t'_4-t'_3)$.

14. The process according to claim 5, wherein at least during the waiting time $(t_2-t_1)$, $(t_4-t_3)$, $(t'_2-t'_1)$ and/or $(t'_4-t'_3)$, the capacity of the volume filled with the mixture to be separated is less than the capacity of the volume which receives a cut of said mixture through the membrane.

15. The process according to claim 11, wherein the ratio of the capacity of the volume filled with the mixture to be separated to the capacity of the volume which receives a cut of said mixture through the membrane is at most $1/10$.

* * * * *